United States Patent [19]

Assarsson et al.

[11] 4,279,847
[45] Jul. 21, 1981

[54] METHOD FOR CONTINUOUS MANUFACTURE OF FOAMED PLASTIC

[75] Inventors: Alf G. Assarsson; Heikki Korpela, both of Helsingborg, Sweden

[73] Assignee: Gulfeber, A.B., Sweden

[21] Appl. No.: 56,143

[22] Filed: Jul. 9, 1979

[30] Foreign Application Priority Data

Jun. 1, 1979 [SE] Sweden .................. 7904856

[51] Int. Cl.³ .................................. B29D 27/00
[52] U.S. Cl. ............................. 264/51; 264/53
[58] Field of Search .......................... 264/51, 53

[56] References Cited

U.S. PATENT DOCUMENTS

| | | | |
|---|---|---|---|
| 3,065,500 | 11/1962 | Berner | 425/4 C |
| 3,178,768 | 4/1965 | Edberg | 425/4 C |
| 3,383,441 | 5/1968 | Norrhede et al. | 264/51 |
| 3,408,690 | 11/1968 | Jacob | 425/4 C |
| 3,427,372 | 2/1969 | Berner | 264/51 |
| 3,594,461 | 7/1971 | Jacob | 264/51 |
| 3,709,651 | 1/1973 | Rivat-Lahousse | 264/51 |
| 3,832,106 | 8/1974 | Rivat-Lahousse | 425/4 C |
| 3,888,608 | 6/1975 | Holl | 425/4 C |
| 3,895,086 | 7/1975 | Berner | 425/4 C |
| 3,971,838 | 7/1976 | Yazawa | 425/4 C |
| 3,986,918 | 10/1976 | Berner | 264/51 |

Primary Examiner—Maurice J. Welsh
Attorney, Agent, or Firm—Shlesinger, Fitzsimmons & Shlesinger

[57] ABSTRACT

Method and device to be used in the continuous manufacture of foamed plastic in which pre-expanded granules of thermoplastic material are introduced into a channel (38) defined on at least two sides by the inside surfaces (18) of endless, perforated moving belts. Passing through a first zone (26) of the channel and in direct contact with steam injected through the belts, the granules are caused to expand further and to sinter or agglomerate to form a coherent, continuous thermoplastic strip or web (21). This is then treated by a vacuum process in a second zone (28) of the channel. In order to bring about an increase in the machine's (10) capacity for producing foamed plastic, or, alternatively, to reduce its length, the thermoplastic web (21) is cooled by a "forced cooling process" taking place in the third zone (30) of the channel in which the inner surfaces (18) of the belts are acted upon by a coolant of higher thermal capacity than air. A suitable coolant would be a liquid; a special apparatus (34, 36, 44, 46, 48, 50) is therefore provided to direct the liquid against and/or along the said surfaces (18) of the belts for at least a section (32) of the third zone (30) of the channel.

3 Claims, 5 Drawing Figures

Material 20 kilos/m

——— Secondary fermentation as related to speed
- - - - Torque requirement ———— " ————

METHOD FOR CONTINUOUS MANUFACTURE OF FOAMED PLASTIC

The following invention relates to a method and device in continuous manufacture of foamed plastic, in which pre-expanded grains or granules of thermoplastic material are introduced into a channel defined on at least two sides by the inside surfaces of endless, perforated moving belts, in which the granules, passing through the first zone of the channel and in direct contact with steam injected through the belts, are caused to soften, expand further and sinter or agglomerate to form a coherent, continuous thermoplastic strip or web; this is then treated by a vacuum process in the second zone of the channel; and, finally, the material is cooled in a third zone.

The invention provides for a device especially designed for use with a machine of the type described in Swedish Pat. No. 171,095.

The chief objective of the invention is to enable production to be increased in machines of the aforementioned type. Alternatively, its application will allow the total length of the machine to be reduced while yet retaining its original production capacity.

In achieving such increase in production capacity or reduction in the length of the machine, it proved to be of the greatest advantage to concentrate on the problems arising from the cooling of the continuous strip of thermoplastic material. The purpose of the cooling process is first to reduce the excess pressure built up in the cells of the thermoplastic material in the steam zone, and secondly, to reduce the temperature of the material so as to make it less soft and elastic and to make it able to withstand any excess of pressure obtaining in the cells. Good dimensional stability is obtained by cooling in this manner.

Clearly, the capacity of the manufacturing process can therefore be said to be directly related to the cooling rate of the thermoplastic material. If cooling efficiency is poor for a given production speed, "after-expansion" will set in the thermoplastic material as a result, i.e. it will become uncontrollably thicker and broader than intended as it leaves the aforementioned machine channel, at least two sides of which are defined by the perforated moving belt.

The build-up of pressure in the cells of the thermoplastic material as they pass through the steam zone causes each granule of material to expand and agglomerate into a sinter in the form of a homogeneous web. This positive pressure is the sum of three distinct pressures acting on the material, viz. the pressure built up by the expansion gases in the material activated by the heating process; the pressure of the water vapour diffused into the cells of the material during treatment in the steam zone; and the pressure brought about by the expansion of the air diffused into the cells of the material during earlier stages of treatment.

As soon as the grains of the thermoplastic material, here spoken of as the granules, have attained the desired degree of expansion and sintering so as to form a homogeneous web, it is therefore desirable to stabilize the web as rapidly as possible, that is, to reduce its pressure and temperature. It is particularly time-consuming to bring about a reduction in temperature in the central parts of the web great enough to enable the walls of the cells to harden enough to be able to withstand the pressures discussed above. In practice, only on the outer surface of the web are the cell walls cooled with anything approaching efficiency. Excellent cooling has now, however, proved to be possible if the mixture of gases - pentane, air and water vapour - present under pressure in the cells can be made to diffuse out under the material and thereby reduce the positive pressure to such an extent that the walls of the cells are able to withstand any further undesirable expansion. Such diffusion takes place through numerous microchannels in the cell structure, and it is therefore of crucial importance to keep these microchannels as open as possible for as long as possible. This is particularly true of the outermost layer of the web. While the thermoplastic material is being caused to expand in the steam zone it is confined by the smooth walls of the belts, which are, of course, hot; and there is a tendency for the material in the region of the walls to flow outwards to form a "casting skin" denser than the rest of the material which becomes thicker and denser the longer the walls of the belts are heated. The denser the surface of the material is allowed to become the more difficult it will be for the gaseous mixture in the cells to diffuse outwards, and the longer the period for which the web will have to be retained between the walls of the belts. In consequence, production capacity is limited.

On the basis of the above, it would clearly be of advantage to make the outer surface of the thermoplastic material more permeable to gas by cooling the surface of the web from 100°-120° C. down to approximately 70° C. by a method acting more rapidly than those used hitherto. By this means, the desired reduction in the period required for the drop in pressure would be achieved, giving not only to a proportional rise in production capacity but also better dimensional stability.

In bringing about the desired cooling of the surface of the web in the method described in the introductory paragraphs, it has proved to be of advantage, as specified in the invention, to subject the continuous web of thermoplastic material to a forced cooling process such that the appropriate parts of the belts, in at least one section of the cooling zone, are acted upon by a coolant of higher thermal capacity than air. This can be brought about by a device comprising an apparatus for directing the coolant onto and/or along the sections of the belt in question, a particularly suitable arrangement being for the said apparatus to incorporate a series of spray nozzles so designed as to be able to direct the coolant onto the appropriate sections of the belts.

The invention will be described in greater detail in the paragraphs to follow by reference to the appended drawings.

Figure 1:
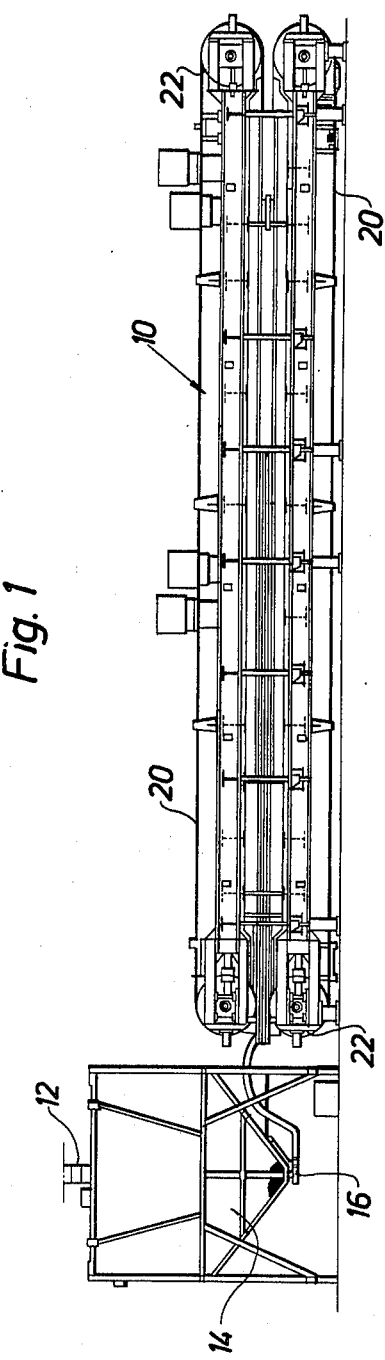
FIGS. 1 and 2 show general views, in section and in plan respectively, of the greater part of a machine for manufacturing formed plastic of conventional type, this machine being fitted with a cooling section designed in accordance with the principles of the invention.
Figure 2:
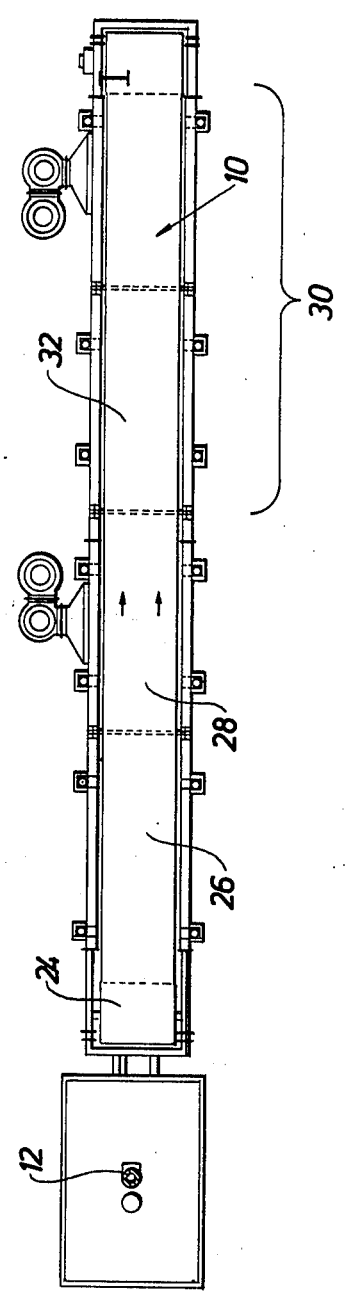

A description of the function of the machine 10 for the manufacture of foamed plastic illustrated in FIGS. 1 and 2 will first be given by way of recapitulation.

The thermoplastic material used as the basic material for the manufacture of foamed plastic, preferably polystyrene, takes the form of expandable grains or granules, which are caused to expand by conventional means until the desired degree of density is obtained. After expansion the granules are stored for a period depending on their density and the expansion properties of the material.

The material so expanded is fed from the storage bin to a hopper 14 via a conveying pipe 12 by means of an impeller not illustrated here. Ejectors 16 then expel the expanded material out of the hopper 14 into a channel in the machine itself defined on two sides by the inside surfaces 18 of perforated, endless belts 20, these belts 20 running round drums 22 of identical design. The material is conveyed by the belts, which are made of steel, through a steam sluice 24 into an initial zone 26 of the channel in which the material is subjected to the action of water vapour heated to a temperature of approximately 100°–120° C. passing through fine holes in the steel belts 20. Here the material expands to its final size and is sintered to become a homogeneous thermoplastic web 21. The web 21, now provided with its final dimensions, is next conveyed into a second zone 28 of the channel in which its moisture content is removed by a vacuum treatment process.

Having passed through the second zone 28, the web 21 is moved through a third zone 30 of the channel, intended for cooling and comprising at least one section 32 in which the web is subjected to a forced cooling process making use of the new cooling principles. The third zone 30 of the channel may also comprise fans, as in conventional practice, which force air at room temperature through a number of cooling boxes open and unsealed in the direction of those parts of the belts defining the channel. In this case, special extraction fans may also be provided for removing the heated air.

After cooling, the thermoplastic material leaves the machine 10 in the form of a continuous strip of web which may be further treated by methods already familiar in themselves; these will therefore not be reviewed further in the present discussion.

Figure 3:
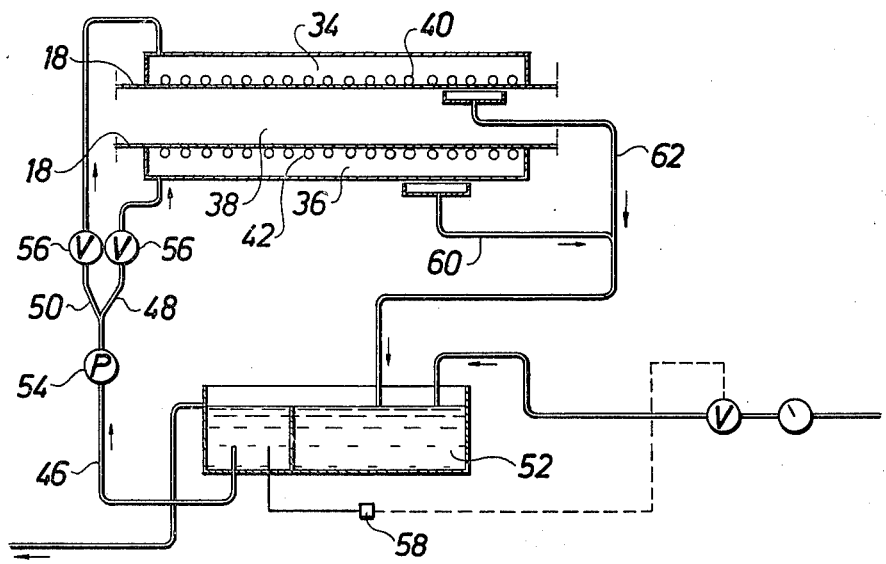
FIG. 3 shows a schematic representation of a longitudinal section of an embodiment of a cooling section for use in, for example, a machine of the type illustrated in FIGS. 1 and 2.

FIG. 3 shows that part 32 or section of a cooling zone, designed in accordance with the principles of the invention, to be incorporated in the machine 10 described above and otherwise familiar. The dehumidified, continuous web 21 (not illustrated in FIG. 3) passes into this section 32 from the left as shown in the figure and is fed out at the right. In conjunction with the respective sections of the belts 18 are mounted an upper 34 and a lower 36 cooling box, each of which is open and unsealed in the direction of that section of the belt defining the channel 38 and which is supported by guiding rollers, 40 and 42 respectively.

Figure 4:
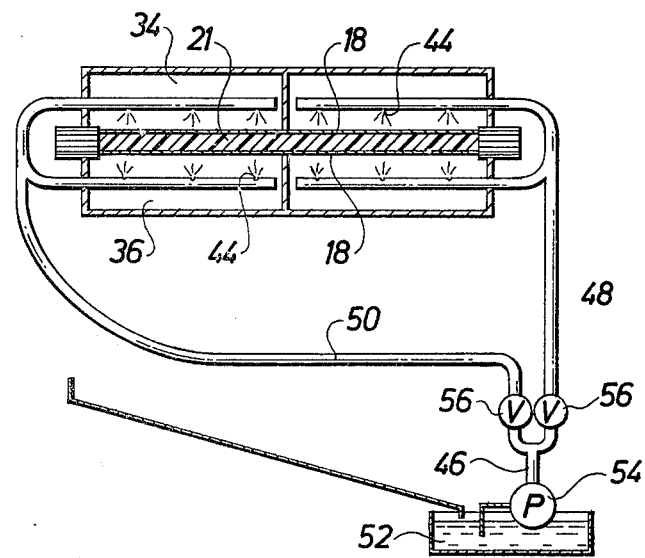
FIG. 4 shows a cross section of the cooling section illustrated in FIG. 3, the feeder ducts and spray nozzles of the section being particularly emphasized.

In order to ensure the best possible product, it is advisable that both main surfaces of the continuous web 21 are cooled by identical means. This is achieved by the provision of special spray nozzles 44 which, as is most clearly apparent in FIG. 4, are connected by their corresponding ducts 46, 48, 50 to a supply of coolant 52, from which the coolant is removed by a pump 54 to be forced through the nozzles 44 in the desired direction against the two main surfaces of the continuous web. A valve 56 is mounted in each feeder duct in order to permit any adjustment as may be desired with regard to the temperature of the web. A thermostat 58 is mounted on the supply of coolant 52, allowing the temperature of the cooling liquid stored therein to be kept at a constant level. This liquid is then pumped out from its tank 52 by the pump 54 into the ducts 46, 48, 50, is carried into the upper 34 and lower 36 cooling boxes described above and is here forced through the spray nozzles 44 to make direct contact with the outside surfaces of the two inner sections of the belts 18. The ends of the cooling boxes 34, 36 at the infeed section described above are fitted with open draining ducts 60 and 62 for removal of the heated waste liquid.

Modifications of the device described above are clearly possible while still remaining within the framework of the basic idea of the invention.

Figure 5:
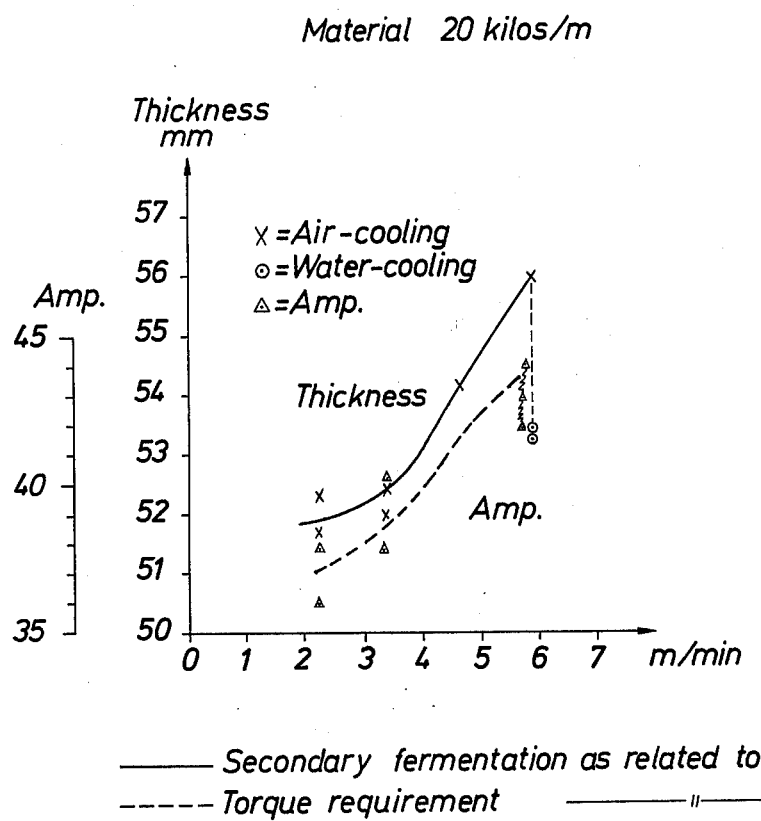
FIG. 5 shows a graph illustrating the advantages of forced cooling by water as compared to conventional cooling methods using air at room temperature.

The graph illustrated in FIG. 5 shows the results obtained in a machine using the forced cooling method. Both after-expansion and torque requirements are shown as a function of the speed of the conveyor belt. Initially, the machine is running with the belt moving slowly; this speed is, however, gradually increased and the thermoplastic material is allowed to continue expansion. In the graph, the continuous line A-B represents after-expansion by comparison with belt speed when conventional air cooling is used. At B, the new method of forced cooling is introduced, and after-expansion is here observed to have almost entirely ceased. Increasing the speed still further brings about slight increases in thickness, as indicated by the line C-D, but such increases are less than previously.

As is also clear from the graph in FIG. 5, the power requirements for driving the machine are largely proportional to the after-expansion of the material, meaning that the forced cooling method will enable savings of power to be made.

We claim:

1. A method for the continuous manufacture of foamed plastic, in which pre-expanded granules of thermoplastic material are introduced into a channel defined on at least two sides by the inside surfaces of the two confronting inner sections of a pair of endless, perforated moving belts, and in which the granules, passing through a first zone of the channel, are in direct contact with steam injected through the belts, and are caused to expand further and sinter or agglomerate to form a coherent, continuous strip or web which is then treated by a vacuum process in a second zone of the channel, and is finally cooled in a third zone of the channel, characterized in that two main surfaces of the web are subjected to the same forced, rapid cooling process from 100°–120° C. to approximately 70° C. by causing the outside surfaces of said two inner sections of the belts, for at least a part of the third zone of the channel, to be acted upon by a coolant of higher thermal capacity than air, said web thus being indirectly cooled by said coolant via the belts, the mixture of gases present under pressure in said web, being made to diffuse out of the thermoplastic material to reduce the positive pressure thereof to such an extent that the walls of its cells withstand further undesired expansion.

2. The method of claim 1, characterized in that a liquid is used as said coolant.

3. The method of claim 2, characterized in that water is used as said coolant.

* * * * *

UNITED STATES PATENT OFFICE
CERTIFICATE OF CORRECTION

Patent No. 4,279,847         Dated   July 21, 1981

Inventor(s)     Alf G. Assarsson & Heikki Korpela

It is certified that error appears in the above-identified patent and that said Letters Patent are hereby corrected as shown below:

On the title page, in the Assignee paragraph [73], the word "Gulfeber" should be --Gullfiber--.

Signed and Sealed this

*Twenty-ninth* Day of *March 1983*

[SEAL]

*Attest:*

GERALD J. MOSSINGHOFF

*Attesting Officer*    *Commissioner of Patents and Trademarks*